April 20, 1937.  J. W. TATTER  2,077,908
BRAKE
Filed Aug. 29, 1930  2 Sheets-Sheet 1
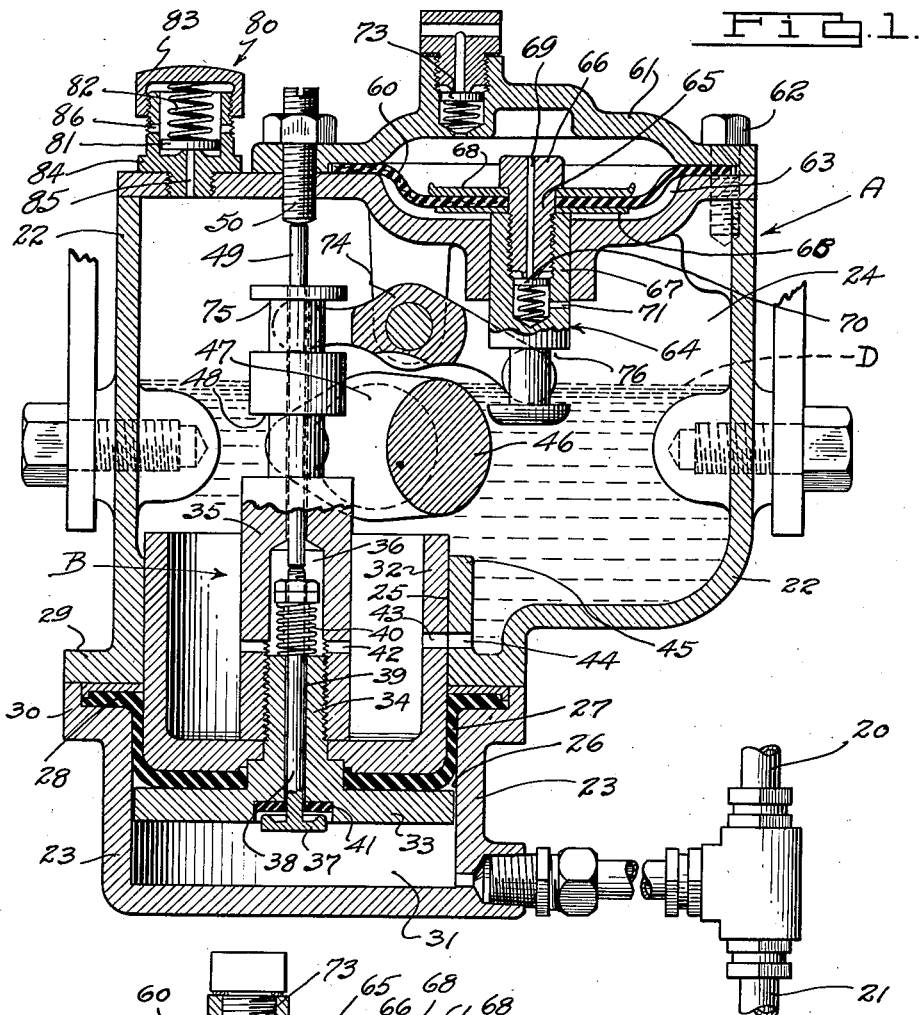
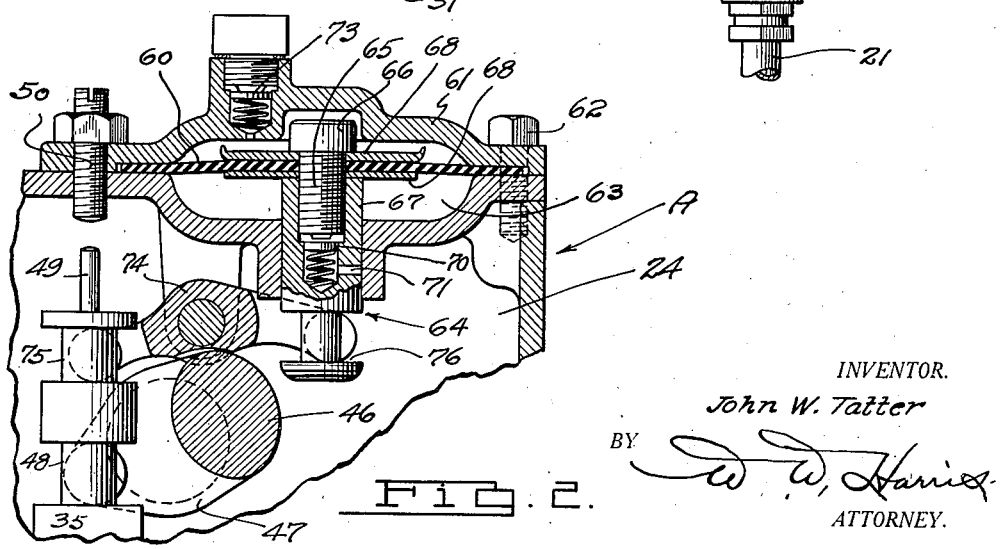
INVENTOR.
John W. Tatter
BY
ATTORNEY.

April 20, 1937.    J. W. TATTER    2,077,908
BRAKE
Filed Aug. 29, 1930    2 Sheets-Sheet 2
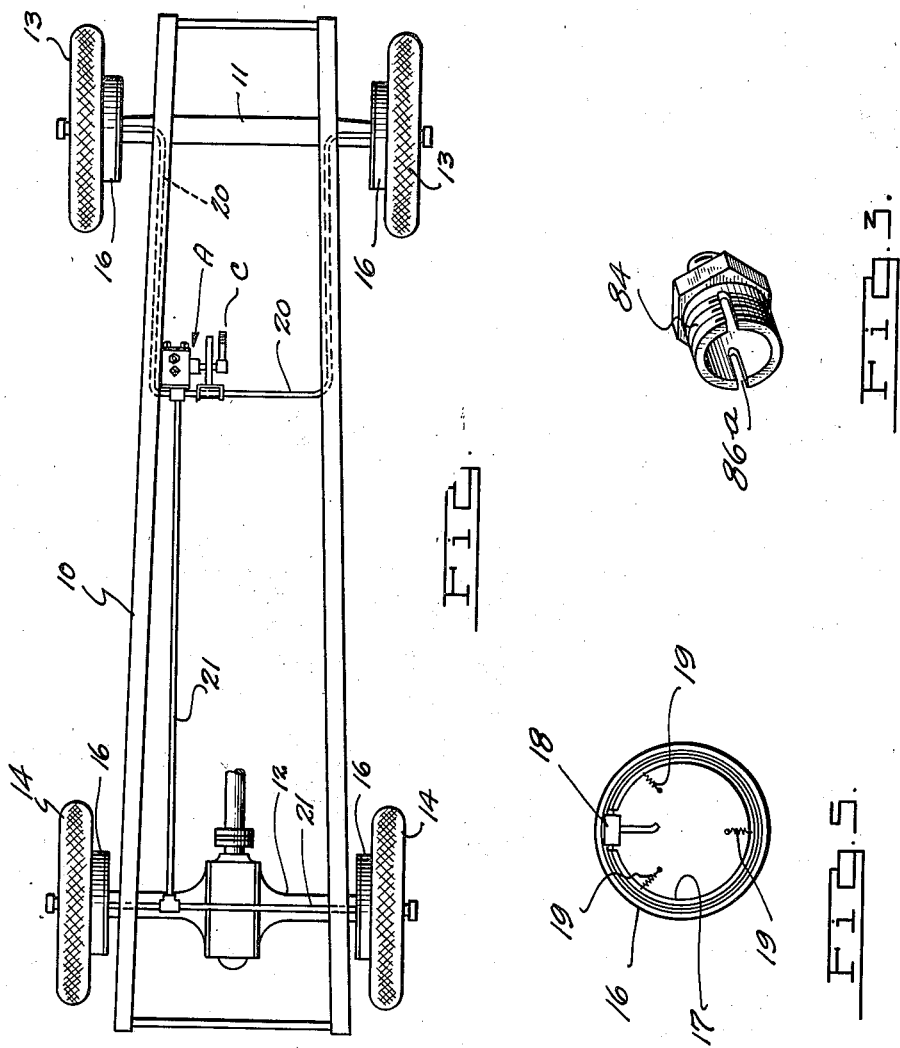
INVENTOR.
John W. Tatter
BY
W. W. Harris
ATTORNEY.

Patented Apr. 20, 1937

2,077,908

UNITED STATES PATENT OFFICE 2,077,908

BRAKE

John W. Tatter, Detroit, Mich., assignor, by mesne assignments, to Bendix Products Corporation, South Bend, Ind., a corporation of Indiana Application August 29, 1930, Serial No. 478,699

10 Claims. (Cl. 60—54.6)

My invention relates to brakes and more particularly to the fluid supply means for a fluid operated brake system preferably employing a non-compressible liquid as the fluid medium.

In a fluid brake system of the character specified above it is customary to provide means for maintaining a predetermined initial fluid pressure in the brake system in order to compensate for wear of the braking devices and maintain a substantial constant clearance between the brake drum and brake shoe. Usually this initial fluid pressure is maintained in the fluid brake system by providing special check valves intermediate the fluid pressure generating means and the brake system which will permit the fluid under pressure to pass freely into the brake system to actuate the brake devices, but which will close when the fluid pressure in the brake system is lowered to a predetermined point thereby maintaining the required predetermined initial fluid pressure in the system and insuring reliable braking means for the vehicle or other moving machine with which the brake system is incorporated.

One disadvantage with the present means employed for maintaining a predetermined initial fluid pressure in the brake system is that these check valves are relatively expensive and are required to be rather accurately adjusted to insure the best results. Also these check valves are placed in the system where relatively high fluid pressures are maintained at times and consequently are subjected to wear and excessive strains at certain times, necessitating frequent adjustment or replacement. Furthermore, it is difficult to make the adjustment or replacement because the check valves are located in the system where it is often-times inconvenient to gain access to.

An object of my present invention is to provide means for maintaining an initial fluid pressure in a fluid operated brake system of such a character and so positioned that the same may be readily adjusted and serviced with a minimum of interference with the brake assembly.

A further object of my invention is to provide means for maintaining an initial fluid pressure in a fluid operated brake system employing means for generating fluid pressure in which the brake system is arranged in open communication with the fluid pressure generating means.

A still further object of my invention is to provide means for maintaining an initial fluid pressure in a fluid operated brake system employing a master cylinder provided with a reservoir and a cylinder in which a piston is operated for building up fluid pressure in the brake system, said fluid brake system arranged in open communication with the cylinder, by providing means for applying pressure to the fluid, preferably a non-compressible liquid, in the reservoir and providing means permitting the transference of this pressure from the reservoir to the fluid brake system.

Further features of my invention, relate to a novel structure for obtaining the above objects to which ready access may be had, and which may be economically constructed and assembled with a fluid brake system.

For a more detailed understanding of my invention, reference may be had to the accompanying drawings which illustrate one form which my invention may assume, and in which Fig. 1 is a sectional view of a master cylinder constructed in accordance with my invention and adapted for assembly with a fluid pressure operated brake system, Fig. 2 is a fragmentary sectional view of a portion of the master cylinder showing the parts in an operating position, Fig. 3 is a detailed perspective view of modified form of pressure relief valve, Fig. 4 is a diagrammatic plan view of a vehicle equipped with my fluid pressure operated brake system, and Fig. 5 is a diagrammatic view of a brake drum and a fluid pressure actuated brake device.

My invention is incorporated in a structure adapted to be associated with a vehicle such as an automobile or the like, which comprises a chassis frame 10, front and rear axles 11 and 12 respectively, with which are respectively assembled the front and rear wheels 13 and 14. Fluid pressure actuated brake means are assembled to all four wheels of the vehicle and each comprises a brake drum 16 secured to the wheel, an expanding brake shoe or shoes 17 associated with each brake drum, and a fluid pressure actuated device 18 for actuating the shoe or shoes. Preferably, tension springs 19 are attached to the shoe or shoes to return the same to an inoperative position when the fluid pressure is relieved. The brake devices 18 associated with the front wheels are operatively connected with a fluid conduit 20, while the devices 18 associated with the rear wheels are operatively connected with a fluid conduit 21.

A master cylinder A comprising upper and lower castings 22 and 23 respectively, which are secured together, is associated with the fluid pressure operated brake system, and is so actuated as to build up the fluid pressure in the brake system for actuating the brake means by expanding the brake shoe or shoes through the agency of the fluid pressure actuated devices 18. A reservoir 24 is constructed in the upper master cylinder casting 22 and is provided with an opening 25 adapted for registration with an opening 26 in the lower casting 23. An expansible cup shaped member 27 is assembled with the master cylinder structure, the body portion of said cup depending within the opening 26 and the flange 28 of the cup being preferably clamped between the flanges 29 and 30 respectively of the upper and lower castings 22 and 23. Preferably the cup is constructed of rubber or some other yieldable material.

The lower master cylinder casting 23 is provided with a chamber 31, preferably cylindrical in cross-section in which the piston structure B is arranged to operate. The piston comprises a cup 32 and a piston head 33 provided with an externally threaded stem 34, the bottom wall of the rubber cup 27 being clamped between the two piston elements 32 and 33. The clamping stud 35 is provided with a hole 36 extending longitudinally therethrough, the lower portion being enlarged in diameter and internally threaded to receive the externally threaded stem 34 of the piston head. A valve 37 having a stem 38 is associated with the piston, the stem of the valve longitudinally slidably supported in the hole 39 extending longitudinally in the stem 34 of the piston head element, a compression spring 40 engaging the valve stem 38 to yieldingly seat the valve on the rubber seat 41 carried by the piston head 33. The hole or bore 39 is preferably larger in diameter than the valve stem 38 so that when the valve is unseated, the fluid chamber 31 is in open communication with the fluid reservoir 24, the hole 36 in the clamping stud 35 with which the hole 39 communicates being openly connected with the reservoir by the passages or holes 42 in the walls of the tubular clamping stud 35. Preferably a hole 43 is constructed in the wall of the cup 32 which is adapted to register with a hole 44 formed in the guide wall 45 carried by the upper casting 22, when the piston is at rest or in an inoperative position as shown in Fig. 1, said hole 44 communicating with the interior of the reservoir 24 adjacent the bottom.

A rock arm 46 having the yoke arms 47 is rotatably supported by the upper casting 22, the yoke arms being arranged to engage in the annular groove 48 carried by the clamping stud 35 secured to the piston structure, so that when the operator steps on the brake pedal C, the piston is depressed, the rock arm and piston being returned, in a conventional manner, by yielding or resilient means (not shown) suitably connected with the brake pedal mechanism to an inoperative position when the pressure on the brake pedal is released.

The valve 37 is arranged to be unseated when the piston is in an inoperative position and this is accomplished by providing a pin 49 that is slidably supported by the stud 35, and axially aligned with the valve stem 38. The pin 49 engages an adjustable stop 50 and is so constructed that it will engage the valve stem 38 and depress the same when the piston is positioned as shown in Fig. 1, thereby unseating the valve 37 and establishing communication between the fluid chamber 31 and the fluid reservoir 24. As soon as the piston is moved, the pin is disengaged from the stop 50 and the valve 37 is seated by the spring 40.

The piston is operated to build up the fluid pressure in the fluid chamber 31 and in the fluid system which is arranged in open communication with the fluid chamber. When the valve 37 is opened any deficiency of fluid in the system may be replenished by the fluid in the reservoir. In order to maintain a predetermined initial fluid pressure in the fluid brake system, I have provided means for applying a predetermined pressure on the fluid in the reservoir, this pressure being substantially the same as the initial fluid pressure which is desired to be maintained in the fluid brake system. Thus, when communication is established between the fluid reservoir 24 and fluid chamber 31, the fluid pressure of the reservoir will be transmitted to the brake system.

I have provided a novel structure within the master cylinder for generating the pressure within the reservoir 24 which consists of an air pump for building up air pressure in the reservoir. This pump may be operated independently of the piston, but I prefer to operatively connect the air pump with the piston so that air is pumped into the reservoir at every application of the brakes. The air is compressed by the device illustrated in Figs. 1 and 2 which comprises a flexible diaphragm 60 constructed of rubberized fabric or other yieldable material that is clamped to the top of the casting 22 by a dome shaped cover 61 secured to the casting 22 by means of bolts 62 or other suitable fastening devices. That portion of the casting under the diaphragm is depressed to form a recess 63 which cooperates with the cover 61 to form a pump chamber. A stem structure 64 is secured to the flexible diaphragm and preferably consists of an externally threaded stud 65 having a head 66 engaged with the top surface of the diaphragm, and a hollow internally threaded member 67 screwed onto the threaded portion of the stud 65, metal washers 68 fitted between the diaphragm and the head 66 and the diaphragm and member 67. The stud 65 is provided with a hole 69 extending longitudinally therethrough and a spring pressed check valve 70 is mounted in the hollow member 67, said member having a passage 71 therein placing the reservoir in open communication with the interior of the member. Air under pressure may pass through the hole or passage 69 from that portion of the pump chamber above the diaphragm past the check valve 70, into the interior of the member 67 and thence into the reservoir. Any suitable form of check valve may be assembled in the cover 61 and I have illustrated such a valve at 73 which will permit air to be sucked into the pump chamber.

Means comprising a pivoted rocker arm 74 are employed to actuate the air pump, one end of the rocker arm 74 being engaged in an annular groove 75 carried by the clamping stud 35, and the other end being engaged in an annular groove 76 carried by the member 67. Thus, as the piston is reciprocated the stem structure 64 will be also reciprocated, Fig. 2 illustrating the position of the diaphragm and stem at the upper end of the stroke when the air above the diaphragm has just been expelled into the reservoir. On the down stroke of the air pump more air will be drawn into the pump chamber through the check valve 73 and the compressing action will be repeated when the piston B is again advanced.

A pressure relief valve assembly 80 is mounted in the casting 22 and adjusted to maintain a predetermined maximum air pressure in the reservoir 24, the valve member 81 seated by the spring 82, the compression of the spring being adjusted by the adjustable nut or cover 83. The valve seat is carried by the cup-shaped nipple 84, and the excess air is permitted to escape from the reservoir through the valved passage 85 into the interior of the cup-shaped nipple and thence through the holes 86 in the walls of the nipple into the atmosphere. By properly adjusting the air pressure relief valve 80, any predetermined air pressure may be maintained in the reservoir, thereby maintaining a similar predetermined initial fluid pressure in the fluid brake system, as the said fluid brake system is placed in communication with the fluid reservoir when the piston B is in an inoperative position. Fig. 3, illustrates a nipple of modified construction which is provided with slots 86—a instead of the holes 86 illustrated in Figs. 1 and 2, the air escaping through the slots as the cover 83 does not completely cover the slots. Preferably the liquid fluid employed in my brake system fills the reservoir to approximately the level as indicated by the dotted line D. The air inlet is of course preferably located above the level D.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a fluid brake system, the combination of means for applying pressure to the fluid of the brake system, said means being provided with a rod having a plurality of portions, each of said portions having a shoulder thereadjacent, air pump means provided with a rod having a portion with a shoulder thereadjacent, pivotally mounted means engaging the shoulder adjacent said portion of the rod of said air pump means, said pivotally mounted means engaging the shoulder adjacent one of said portions of said first mentioned means, and pivotally mounted means engaging the shoulder of the other of said portions of said first mentioned means.

2. In a fluid brake system, the combination of means for applying pressure to the fluid in the brake system and comprising a fluid reservoir; a fluid chamber in open communication with the fluid brake system; a piston formed with a valve opening positioned for operating in said chamber; means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position; and means including a plunger for introducing air to a predetermined pressure into said reservoir to maintain a substantially constant initial fluid pressure in said brake system, said plunger and said piston being operatively connected by a double ended lever member pivotally mounted therebetween.

3. In a fluid brake system, the combination of means for applying pressure to the fluid in the brake system and comprising a fluid reservoir; a fluid chamber in open communication with the fluid brake system; a piston formed with a valve opening and comprising a pair of spaced metallic members having clamped between them a resilient diaphragm member which has its periphery clamped in the side walls of the chamber positioned for operating in said chamber; means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position; and means including a plunger for introducing air to a predetermined pressure into said reservoir to maintain a substantially constant initial fluid pressure in said brake system, said plunger and said piston being operatively connected by a double ended lever member pivotally mounted therebetween.

4. In a fluid brake system, the combination of means for applying pressure to the fluid in the brake system and comprising a fluid reservoir; a fluid chamber in open communication with the fluid brake system; a piston formed with a valve opening and positioned for vertical movement in said chamber upward and downward beneath an upper limit below the normal liquid level in said reservoir; means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position; and means including a plunger for introducing air to a predetermined pressure into said reservoir to maintain a substantially constant initial fluid pressure in said brake system, said plunger and said piston being operatively connected by a double ended lever member pivotally mounted therebetween.

5. In a fluid brake system, the combination of means for applying pressure to the fluid in the brake system and comprising a fluid reservoir; a fluid chamber in open communication with the fluid brake system; a piston formed with a valve opening and positioned for operating in said chamber, means for placing the fluid chamber in communication with the reservoir when the piston is in an inoperative position, comprising a valve, and a stop member contacting with a portion of said valve when the piston is in its inoperative position; and means including a plunger for introducing air to a predetermined pressure into said reservoir to maintain a substantially constant initial fluid pressure in said brake system, said plunger and said piston being operatively connected by a double ended lever member pivotally mounted therebetween, said valve comprising a resilient sealing member secured to the lower face of said piston and formed with an opening, a closure member arranged at times to bear upon said sealing member and having a stem extending through the opening in said sealing member and through the valve opening formed in said piston, a spring arranged to urge said closure member to contact with said sealing member, said stop member being arranged when the piston is in its released position to be contacted by the end of said stem to move said closure member from its seat on said sealing member against the influence of said spring.

6. In a fluid brake system, the combination of means for applying pressure to the fluid in the brake system and comprising a fluid reservoir; a fluid chamber in open communication with the fluid brake system, a piston formed with a valve opening and positioned for operating in said chamber, means for placing the fluid chamber in communication with the reservoir when the piston is in an inoperative position, and means for introducing air under a predetermined pressure into said fluid reservoir to maintain a substantially constant initial fluid pressure in said brake system comprising a casing element secured to said reservoir to form an air chamber, a check valve associated with said air chamber allowing the ingress of air but preventing the egress of air therefrom, said chamber being formed with a cylindrical opening leading therefrom to the reservoir, a plunger in said cylindrical opening movable longitudinally thereof and formed with an opening extending therethrough provided with a check valve allowing the passage of air from said air chamber to said reservoir but preventing the passage of air in the opposite direction, and a diaphragm clamped in said air chamber at its periphery and secured in sealing relation with said piston to move with the piston.

7. In a fluid brake system, the combination of means for applying pressure to the fluid in the brake system and comprising a fluid reservoir; a fluid chamber in open communication with the fluid brake system; a piston formed with a valve opening positioned for operating in said chamber, and means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position.

8. In a fluid brake system, the combination of means for applying pressure to the fluid in the brake system and comprising a fluid reservoir; a fluid chamber in open communication with the fluid brake system; a piston formed with a valve opening and comprising a pair of spaced metallic members having clamped between them a resilient diaphragm member which has its periphery clamped in the side walls of the chamber positioned for operating in said chamber; and means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position.

9. In a fluid brake system, the combination of means for applying pressure to the fluid in the brake system and comprising a fluid reservoir; a fluid chamber in open communication with the fluid brake system; a piston formed with a valve opening and positioned for vertical movement in said chamber upward and downward beneath an upper limit below the normal liquid level in said reservoir; means for placing the fluid chamber in communication with the reservoir when the piston is in an inoperative position, comprising a valve stem extending through the valve opening in said piston, a closure member connected with said stem and positioned on the pressure side of said piston, and a stop member contacting with said stem when the piston is in its inoperative position.

10. In a fluid brake system, the combination of means for applying pressure to the fluid in the brake system and comprising a fluid reservoir; a fluid chamber in open communication with the fluid brake system; a piston formed with a valve opening and positioned for operating in said chamber, and means for placing the fluid chamber in communication with the reservoir when the piston is in an inoperative position, comprising a valve, and a stop member contacting with a portion of said valve when the piston is in its inoperative position, said valve comprising a resilient sealing member secured to the lower face of said piston and formed with an opening, a closure member arranged at times to bear upon said sealing member and having a stem extending through the opening in said sealing member and through the valve opening formed in said piston, a spring arranged to urge said closure member to contact with said sealing member, said stop member being arranged when the piston is in its released position to be contacted by the end of said stem to move said closure member from its seat on said sealing member against the influence of said spring.

JOHN W. TATTER.